United States Patent [19]

Sattler

[11] 4,077,925

[45] Mar. 7, 1978

[54] HIGH TEMPERATURE HIGH FLASH POINT NON-AQUEOUS INSULATING VARNISH

[75] Inventor: Frank A. Sattler, Monroeville, Pa.

[73] Assignee: Westinghouse Electric Corporation, Pittsburgh, Pa.

[21] Appl. No.: 745,727

[22] Filed: Nov. 26, 1976

[51] Int. Cl.² ............................ C09D 3/66; C09D 5/25
[52] U.S. Cl. ........................... 260/22 CB; 204/159.19; 260/23 P; 260/40 R; 428/430; 428/458
[58] Field of Search ..................... 260/22 CB, 23 P; 204/159.19

[56] References Cited

U.S. PATENT DOCUMENTS

| | | | |
|---|---|---|---|
| 2,484,215 | 10/1949 | Foster | 260/22 CB |
| 2,600,457 | 6/1952 | Wynstra | 260/22 CB |
| 3,287,293 | 11/1966 | Dalibor | 260/23 P |
| 3,620,989 | 11/1971 | Cummings | 260/22 CB |
| 3,652,471 | 3/1972 | Sattler | 260/22 TN |
| 3,743,615 | 7/1973 | Yethon | 260/22 CB |
| 3,859,235 | 1/1975 | Vargiu et al. | 260/23 P |
| 3,882,006 | 5/1975 | Watanabe et al. | 204/159.19 |
| 3,968,016 | 7/1976 | Wismer | 204/159.19 |
| 3,993,798 | 11/1976 | Brose et al. | 204/159.19 |

Primary Examiner—Ronald W. Griffin
Attorney, Agent, or Firm—D. P. Cillo

[57] ABSTRACT

A high temperature capability, non-aqueous insulating composition is made by admixing: (A) about 40 wt.% to about 90 wt.% of an alkyd component consisting essentially of: the reaction product of a polyhydric alcohol; a fatty acid or its corresponding monoglyceride; and a dibasic aromatic and aliphatic acid mixture, with (B) about 10 wt.% to about 60 wt.% of an alkyl acrylate monomer having a molecular weight of over about 110; the composition characterized by having a flash point of over 45° C.

15 Claims, 2 Drawing Figures

HIGH TEMPERATURE HIGH FLASH POINT NON-AQUEOUS INSULATING VARNISH

BACKGROUND OF THE INVENTION

Polyester resins are well known in the art, where an alkyd ingredient is reacted with about 50 wt. % of a vinyl group-containing monomer, such as styrene, vinyl acetate or vinyl toluene, to provide a fast drying resin which may be diluted by addition of aromatic naphtha or other comparable solvent, as taught by Yetkon, in U.S. Pat. No. 3,743,615. Cummings, in U.S. Pat. No. 3,620,989, recognized that such copolymers are low molecular weight materials and films formed from them tend to be soft. In addition, the use of large amounts of solvents and vinyl monomers posed fire and ecology problems, providing compositions having flash points of about 26° C to 32° C.

Cummings attempted to solve these problems by using a water emulsion copolymer of gylcerol, soy oil, maleic anhydride, phthalic acid and ethylhexyl acrylate or vinyl acetate, where a large excess of maleic anhydride over phthalic acid was used. The Cummings resins, while having good thermal properties at about 135° C to 160° C, have high energy requirements, since they need a long baking period to remove all of the water.

What is needed is a non-aqueous polyester resin composition, having at least about 75% solids and good pot life, which is useful in 155° C to 220° C environments, and which quickly cures to a hard, tough insulation, with minimal solvent removal, energy requirement and fire hazard problems.

SUMMARY OF THE INVENTION

These problems are solved by providing a 75 wt. % to 100 wt. % solids, high temperature capability, low viscosity, non-aqueous insulating varnish composition, having an alkyd component blended and copolymerized with a high molecular weight reactive monomer, which will provide a flash point of at least 45° C.

The alkyd component contains the reaction product of a polyhydric alcohol, such as glycerol; organic aromatic dibasic acids and organic aliphatic dibasic acids, such as isophthalic acid and maleic anhydride and unsaturated fatty acids, or their corresponding monoglycerides, such as soybean oil fatty acid, or soybean oil fatty acid monoglyceride. The high molecular weight reactive monomer is a high boiling alkyl acrylate monomer, such as 2 ethyl hexyl acrylate, 2 hydroxy ethyl acrylate, tetraethylene glycol diacrylate, hexanediol diacrylate, neopentyl glycol diacrylate, trimethylol propane triacrylate, and pentaerythritol triacrylate. These monomers can be used alone or in mixtures.

The insulating varnish will contain about 40 wt. % to about 90 wt. % alkyd component and about 10 wt. % to about 60 wt. % alkyl acrylate monomer. With the proper catalysts, activators and inhibitors, a resinous composition can be formulated to give good pot life, fast cure, a viscosity of between about 200 cps. to 2,000 cps., a flash point of over 45° C and between about 75° C to about 200° C in 100% solids form, and between a 155° C to 220° C (class F to H+) temperature capability without degradation upon cure.

These varnishes pose no pollution problems since they contain minimal amounts of solvent or are solventless, and have the advantage of a high flash point. These resinous compositions cure to a tough film, and are particularly useful as insulating dipping and impregnating varnish compositions for electrical coils and motors. They can also be used as encapsulating compositions.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 2:
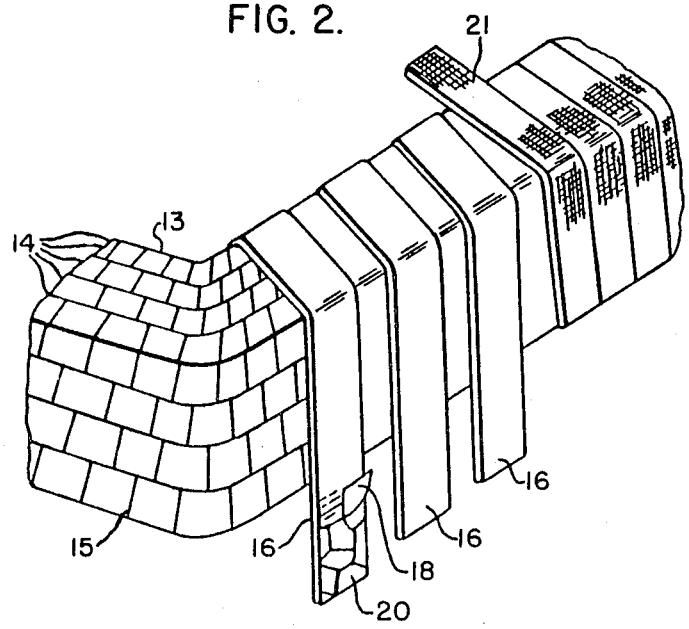
FIG. 2 shows a wrapped, resin-impregnated coil made in accordance with the instant invention.

Polyester resins can be produced by a variety of techniques including condensation of polyhydric alcohols, such as glycerol; 1,2-propylene glycol; diethylene glycol or tris (2-hydroxyethyl) isocyanurate, with a dicarboxylic acid such as isophthalic acid and maleic anhydride. Unsaturated fatty acids containing one or more double bonds per molecule are generally added to reduce viscosity and air inhibition properties, so that a tough, non-tacky film will be formed during cure. Other ingredients can include accelerators to promote fast curing, cross linking agents, inhibitors to prevent room temperature gelation and improve pot life, and ultraviolet radiation photoinitiators, to provide a pre-cure mechanism, whereby resin run-off can be controlled prior to complete cure. This alkyd component is then copolymerized with a reactive monomer.

Polyester resins are produced by heating the component polyhydric alcohols, acids and unsaturated fatty acid at between about 150° C to about 240° C, for about 5 hours to about 10 hours, under an inert blanket of carbon dioxide or nitrogen. The reaction is followed by measuring the acid number, i.e., the number of milligrams of KOH equivalent to the acidity present in one gram of resin. The reaction is continued until the acid number goes down to between about 5 to 25. The alkyd component is then cooled below about 120° C and inhibitor added. The alkyd component is then dissolved in the reactive monomer. The preparation and materials generally used are well known and reference may be made to *Plastic Materials* by J. A. Brydson, pages 431–450, (1966), herein incorporated by reference, for a complete description of their synthesis and properties.

In this invention, the insulating varnish will contain about 40 wt. % to about 90 wt. % of alkyd component and about 10 wt. % to about 60 wt. % of an alkyl acrylate monomer. The alkyd component will comprise the reaction product of about 55 equivalent % to about 70 equivalent % of polyhydric alcohol; about 8 equivalent % to about 25 equivalent % of fatty acid having at least one double bond and about 12 to 18 carbon atoms per molecule, and about 15 equivalent % to about 40 equivalent % of organic dibasic acid mixture, of which about 40 equivalent % to about 90 equivalent % of the organic dibasic acid will be an aromatic (aryl) acid and about 10 equivalent % to about 60 equivalent % will be an unsaturated aliphatic acid.

In one embodiment of the method of this invention, a fatty oil may be reacted with glycerol polyhydric alcohol to form a fatty acid monoglyceride. The oil contains 3 fatty acid moieties and 1 glycerol moiety. When this reaction is used in the method of this invention, less glycerol is required in the alkyd reaction. In totaling the equivalent %, the fatty oil is broken down into its fatty acid and polyhydric alcohol components. Thus, to get the total equivalent % of glycerol, the glycerol added as such, and that contained in the fatty oil are added together to equal total glycerol in the alkyd reaction. The same is true with the fatty acids. Thus polyhydric alcohol and fatty acid, here mean the ingredients added as such plus those components present in a fatty acid monoglyceride if such is present.

The term equivalent %, as employed herein, is calculated as follows:

Equivalent % equals $$\frac{\text{Number of Moles of Total Ingredient} \times \text{Functionality of Ingredient}}{\text{Sum (Number of Moles of Total Ingredient} \times \text{Functionality of Ingredient)}}$$

All ingredients which have reactive groups are considered in the Sum, which serves as the divisor in the formula, whether already reacted or available for reaction when cured. The functional groups are anhydride, carboxyl, and hydroxyl. The polyhydric alcohols may be bifunctional or trifunctional, the dibasic acids will be bifunctional, although trimellitic anhydride should be considered trifunctional, and the unsaturated fatty acids will be monofunctional.

Useful polyhydric alcohols include ethylene glycol; glycerol; 1,2-propane diol; diethyleneglycol; triethyleneglycol; neopentyl glycol; hexamethyleneglycol; 1,4-cyclohexanedimethanol; trimethylol ethane; trimethylol propane; 1,4-butane diol; 1,5-pentane diol; pentaerythritol; and tris (hydroxyalkyl) isocyanurate, of which the most suitable and preferred is tris (2-hydroxyethyl) isocyanurate. It should also be understood that the tautomeric analogs of the isocyanurate compounds such as tris (2-hydroxyethyl) cyanurate may be employed. These polyhydric alcohols can be used alone or in mixtures.

Useful organic aromatic dibasic acids include isophthalic acid; phthalic acid; phthalic anhydride; terephthalic acid; dimethyl terephthalate; trimellitic anhydride and their mixtures. Useful organic, unsaturated aliphatic dibasic acids include maleic acid; maleic anhydride; fumaric acid and their mixtures. Both types of dicarboxylic acid must be present. The aromatic acid is a prime contributor to good high temperature thermal stability of the alkyd component, and should generally be present in the greater amount on a molar basis. The unsaturated aliphatic acid must be present to copolymerize the alkyd component with the alkyl acrylate monomers.

Useful unsaturated fatty acids are those having at least one double bond and containing at least 12, generally about 12 to 18 carbon atoms per molecule. Included are fatty acids of drying oils, which may include up to about 15% of saturated acids, and the term "unsaturated" is used here to include such fatty acids. Examples of unsaturated fatty acids are soybean oil fatty acid, linseed oil fatty acid; tung oil fatty acid; dehydrated castor oil fatty acid; tall oil fatty acid, perilla oil fatty acid and their mixtures.

The corresponding soybean, linseed, tung, dehydrated, castor, tall, and perilla fatty acid monoglycerides, and their mixtures, may also be used alone or mixed with the fatty acids. They can be prepared, for example, by reacting the drying oil, in a monoglyceride reaction, with glycerol and lead oxide catalysts at about 275° C. This involves an ester interchange reaction, to form a fatty acid monoglyceride.

When monoglycerides are to be used, the amount of glycerol polyhydric alcohol present on a molar basis in the drying oil, must be calculated as part of the glycerol or other polyhydric alcohol to be used in the main reaction to form the alkyd component. The drying oil is composed of 3 fatty acid components and 1 glycerol component, each of which must be added to the other ingredients used in the alkyd reaction when computing the equivalent % of ingredients.

Useful alkyl acrylate monomers are those having boiling points over about 200° C and molecular weights over about 110. These type monomers are less volatile, and cure to tougher, more thermally stable films than styrene or vinyl toluene monomers. Useful alkyl acrylate monomers include hexanediol diacrylate; neopentyl glycol diacrylate (NPGDA); trimethylol propane triacrylate (TMPTA); tetraethylene glycol diacrylate (TEGDA); pentaerythritol triacrylate; 2 ethyl hexyl acrylate (EHA); 2 hydroxy ethyl acrylate; and their mixtures, with the first four monomers being preferred.

These monomers provide a flash point for the composition of over 45° C, generally between about 75° C to about 200° C when a solventless 100% solids composition is formulated. By flash point is meant: the lowest temperature at which the composition in an open vessel gives off enough combustible vapors to produce a momentary flash of fire when a small flame is passed near its surface.

In addition, accelerators such as, for example, cobalt naphthenate, tertiary butyl perbenzoate; benzoyl peroxide; and methyl ethyl ketone peroxide are usually added in amounts effective to act as a reaction catalyst, generally about 0.02 part to about 1.0 part per 100 parts varnish, including the alkyd and monomer components.

Inhibitors such as, for example, picric acid, benzoquinone, and hydroquinone are usually added in amounts effective to prevent gelation at 26° C, generally about 0.005 part to about 0.5 part per 100 parts varnish. Both the accelerators and inhibitors may be used alone or in mixtures. Cross linking agents, such as for example hexamethoxymethyl melamine and the like, may be added, generally about 0.5 part to 3 parts per 100 parts varnish.

Photoinitiators may also be added in amounts effective to initiate and promote polymerization, with ultraviolet light exposure, prior to complete cure with heat, so that only minimal amounts of resin will run off the coils during the curing cycle. Typical photoinitiators well known in the art would include, for example, benzophenone, benzoin methyl ether, benzoin ethyl ether, and the like. They may be used at about 0.5 part to about 6 parts per 100 parts varnish.

Filler particles, such as silica, fused quartz, hydrated alumina and the like can also be added in finely divided form, about 10 microns to 300 microns average particle size, at about 0.5 part to about 100 parts per 100 parts varnish, especially when the varnish is to be used for encapsulating applications. Small amounts of thixotroping agents, such as silica gel and the like may also be added at about 0.5 part to about 10 parts per 100 parts varnish. No more than about 25 wt. % of a diluent having a boiling point over 100° C, preferably between 115° C and 145° C, such as methyl cellosolve or xylene is used in the non-aqueous varnish of this invention, so that solids content will range from about 75% to 100%.

Over 25 wt. % diluent and fire hazard and solvent removal problems are presented. The resulting varnish has a viscosity of between about 200 cps. to 2,000 cps. and preferably 200 cps. to 1,000 cps. at 25° C.

The preparation of the impregnating varnish comprises addition of the primary ingredients, except the monomer, in the critical ranges described, by blending at a temperature of between about 150° C to about 240° C, in the presence of an inert gas, until the reaction proceeds to an acid number of between about 5 to 25. The non-aqueous reaction product comprising the alkyd component is then cooled below about 120° C. The alkyd component is then dissolved in the reactive monomer. This provides a non-aqueous impregnating varnish having a pot life of about 2 weeks to one year at 25° C. By pot life is meant the number of weeks required for a sample of this varnish to increase in viscosity by a factor of 10, and proceed to form a semi-solid gel having a viscosity of over about 2,000,000 cps. at 25° C.

Upon heating in an oven to a temperature of between about 85° C to about 155° C, the impregnating varnish will gel in about 5 minutes to 40 minutes. Upon further heating over 135° C, and generally between about 150° C to about 175° C, the varnish will completely cure to a thermoset state in about 2 hours to 20 hours. When cured it will have a temperature capability of between 155° C and 220° C, i.e., it will not melt or degrade at these temperatures after about 40,000 hours of exposure.

Figure 1:
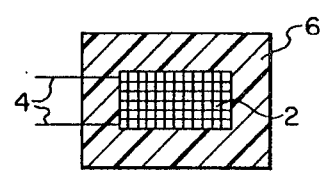
FIG. 1 shows an encapsulated electrical article made in accordance with the instant invention.

FIG. 1 shows an insulated electrical member such as a coil 2, which has conductors 4, potted in a cured insulating casing 6, the casing being the resinous composition applied to the member. FIG. 1 is thus illustrative of certain articles of the invention, namely, electrical or electronic componets potted, encapsulated, or varnished in the composition of this invention.

Referring to FIG. 2 of the drawings, there is illustrated a coil 13, comprising a plurality of turns of conductors 14. Each turn of the conductor 14 consists essentially of a copper or aluminum bar or wire wrapped with turn insulation 15. The turn insulation 15, preferably is prepared from a fibrous sheet or strip impregnated with a bonding resinous insulation.

Ground insulation for the coil is provided by wrapping one or more layers of micaceous insulation, such as mica paper or preferably a composite mica tape 16 about the turn 14. Such composite tape 16 comprises a pliable backing sheet 18 of polyethylene terephthalate mat, having a layer of mica flakes 20 bonded thereto by a liquid resinous binder. To impart better abrasion resistance and to secure a tighter insulation, a wrapping of a tape 21 of a tough fibrous material, for example, glass fiber, asbestos or the like is applied to the coil. When the viscosity of the varnish of this invention is below about 750 cps. at 25° C, it can be used to vacuum impregnate coils of the type described above.

Generally, however, this varnish is used as a dipping varnish, and as such should have a pot life of at least 2 weeks and preferably about 6 weeks. In this application, an assembled motor or other type of electrical apparatus is dipped in a bath of the varnish for about 1 minute to about 5 minutes, and then placed in an oven for curing. Prior to final cure, the varnish may be gelled by ultraviolet light, to prevent varnish run-off. In this case, a photoinitiator is included in the varnish composition. The dip process provides an inexpensive, fast and extremely simple method of insulating a motor or other type electrical device.

EXAMPLE 1

A non-aqueous, high temperature, solventless, insulating, dipping varnish was prepared. A four-neck reaction flask equipped with stirrer, thermometer, nitrogen gas sparge tube and an air condenser, was filled with 253 grams of glycerol polyhydroxy compound; 233 grams of isophthalic aromatic dibasic acid and 425 grams of soybean oil fatty acid (soya fatty acid). The ingredients were heated rapidly with nitrogen sparging to 180° C and then from 180° C to 230° C at a rate of 15° C per hour temperature increase until the mixture was clear. The mixture was then cooled to 190° C and 58.8 grams of maleic anhydride was added. The reaction was continued at between 180° C to 205° C until an acid number of 20 was reached. This alkyd component was then cooled below 100° C and 0.22 grams of picric acid inhibitor was added. This alkyd component was then dissolved in monomers with catalysts added as shown below in TABLE 1, to provide three non-aqueous, solventless varnishes.

TABLE 1

| Sample | Alkyd grams | Reactive Monomers | | | Accelerators | | Cross Linking Agent |
|---|---|---|---|---|---|---|---|
| | | EHA | NPGDA | TEDGA | Co | tBP | HmM |
| 1 | 50 | 40 | | 10 | 0.01 | 0.25 | 2 |
| 2 | 50 | | 50 | | 0.01 | 0.10 | 2 |
| 3 | 50 | 25 | | 25 | 0.01 | 1.00 | 2 |

EHA = ethyhexyl acrylate; NPGDA = neopentyl glycol diacrylate; TEDGA = tetraethylene glycol diacrylate; Co = cobalt naphthenate at 6% cobalt; tBP = tertiary butyl perbenzoate; HmM = hexamethoxymethyl melamine.

These insulating varnishes contained 50 wt.% alkyd component and 50 wt.% alkyl acrylate monomer. The alkyd component contained:

| grams | ingredient/mol wt | = moles | × funct groups | = equivalents |
|---|---|---|---|---|
| 253 | glycerol/92.11 | = 2.74 | × 3(OH) | = 8.22 |
| 233 | aryl acid/166.1 | = 1.4 | × 2(COOH) | = 2.80 |
| 58.8 | aliph. acid/98.1 | = 0.6 | × 2(COOH) | = 1.20 |
| 425 | fatty acid/280 | = 1.51 | × 1(COOH) | = 1.51 |
| | | | Sum = | 13.73 |

Equivalent % polyhydric alcohol = 8.22/13.73 = 59.8%
Equivalent % fatty acid = 1.51/13.73 = 11.0%
Equivalent % aryl + aliph. acid = 4.00/13.73 = 29.2%
  Within the organic dibasic acid mixture:
Equivalent % aryl acid = 2.80/4.0 = 70%
Equivalent % aliph. acid = 1.20/4.0 = 30%
NPGDA mol. wt. = 212; boiling pt. = 320° C+
TEGDA mol. wt. + 302; boiling pt. = 320° C+
Accelerator = 0.11 part of 1.01 parts/100 parts varnish Inhibitor = 0.01 part/100 parts varnish
Cross Linking Agent = 2 parts/100 parts varnish The following tests were made to evaluate the above non-aqueous, 100% solids dipping varnishes. A portion of the varnish was poured into a Gardner viscosity tube and the initial viscosity measured. The viscosity tube was placed in a dark chamber and checked periodically for viscosity increase to determine pot life, as described above in the specification. A 10 gram portion of the varnish was cured in a 2.5 inch diameter dish in a 150° C forced air oven and the gel time determined for a tack-free cake. A 2 gram portion of the varnish in a 2.5 inch diameter aluminum dish was baked in a 150° C forced air over for 18 hours and the weight loss determined in a 200° C forced air oven after 30 days, based on the original 2 grams of varnish. The results of these tests are shown below in TABLE 2:

TABLE 2

| Sample | Viscosity cps. at 25° C | Pot Life weeks at 25° C | Gel Time min. at 150° C | Wt. Loss 30 days at 200° C | Cake 2 hrs. at 150° C |
|---|---|---|---|---|---|
| 1 | 630 | 4 | 15 | 37.4% | slightly soft |
| 2 | 1,290 | 2 | 8 | 17.5% | tough |
| 3 | 950 | 3 | 8 | 22.7% | slightly soft and flexible |

These varnishes would provide good dipping varnishes having adequate pot life, acceptable weight loss, and very good surface properties after a complete cure, since surface properties are good after only 2 hours baking at 150° C. Sample 1, at 630 cps. would also provide a good impregnating varnish. To determine flexibility, an aluminum strip was dipped in Samples 1 and 2, air dried for 5 minutes at 25° C, then baked at 150° C for 2 hours and cooled. The strip was then folded back on itself repeatedly until the film cracked. The films exhibited excellent flexibility and a good dip build: Sample 1 provided 7 folds for 2.8 mils build; Sample 2 provided 16 folds for 2.2 mils build and Sample 3 provided 8 folds for 3.3 mils build.

All of these varnishes have 155° C to 175° C insulating capability and excellent flash points of about 80° C to 200° C. Thermal life tests were run on Sample 1, using IEEE No. 57 procedure on a polyester-amide-imide wire enamel. The life at T° C was as follows: 150 hours at 275° C; 852 hours at 250° C; 1,930 hours at 225° C and over 5,000 hours at 200° C, with an extrapolated temperature capability for 40,000 hours of between 155° C and 188° C.

In another test, 70 grams of the alkyd component was dissolved in 30 grams of ethylhexyl acrylate and 1.0 grams of tertiary butyl perbenzoate added to provide a dipping resin, Sample 3', having a viscosity of 1,390 cps. at 25° C. Glass tape, 1 inch wide and 10 mils thick, was coated in 2 passes with this formulation in an 8 foot high vertical baking tower at 200° C. The varnish was applied to the tape by running the tape through a dip pan and then vertically through two round bars clamped on each side of the tape to limit the amount of varnish applied, and then through the tower at 2 feet/min.

The varnished tapes were tested for breakdown strength using a pair of spring-loaded ¼ inch electrodes, insulated against edge flashover, clamped on each side of the tape. The tape was creased sharply and the breakdown voltage was again measured at the crease. The results are shown in TABLE 2' below:

TABLE 2'

| Sample | Coating Thickness mils | 1 crease | Breakdown kV | Strength kV at fold |
|---|---|---|---|---|
| 3' | 15.5-16.0 | no cracks | 12.0+ | 12.0+ |

This provided a dipping resin having good impregnating qualities, good coatability and excellent flexibility.

EXAMPLE 2

A non-aqueous, high temperature, solventless, insulating, dipping varnish was prepared. The same procedure at the same times and temperatures was followed as in EXAMPLE 1, using 279 grams of glycerol; 233 grams of isophthalic acid; 568 grams of soybean oil fatty acid; 58.8 grams of maleic anhydride and 0.26 grams of picric acid. This alkyd component was then dissolved in monomers with catalysts added as shown below in TABLE 3, to provide three non-aqueous, solventless varnishes.

TABLE 3

| Sample | Alkyd grams | Reactive Monomers | | | Accelerators | | Inhibitor |
|---|---|---|---|---|---|---|---|
| | | EHA | TEGDA | TMPTA | Co | tBP | BQ |
| 4 | 60 | | 13.5 | 26.5 | 0.05 | 0.5 | 0.1 |
| 5 | 70 | | 15 | 15 | | 0.5 | 0.1 |
| 6 | 57 | 5 | 12.8 | 25.2 | 0.01 | 0.25 | 0.1 |

TMPTA = trimethylol propane triacrylate; BQ = benzoquinone.

These insulating varnishes contained from 57 wt.% to 70 wt.% alkyd component and from 30 wt.% to 43 wt.% alkyl acrylate monomer. The alkyd component contained:
Equivalent % polyhydric alcohol = 60%
Equivalent % fatty acid = 13.5%
Equivalent % aryl + aliph. acid = 26.4%
Within the organic dibasic acid mixture:
Equivalent % aryl acid = 70%
Equivalent % aliph. acid = 30%
TMPTA mol. wt. = 296; boiling pt. = 320° C+
Accelerator = from 0.26 part to 0.55 part/100 parts varnish
Inhibitor = 0.1 part/100 parts varnish Tests were conducted using the same procedures as in EXAMPLE 1. The results of those tests are shown in TABLE 4:

TABLE 4

| Sample | Viscosity cps. at 25° C | Pot Life weeks at 25° C | Gel Time min. at 150° C | Wt. Loss 30 days at 200° C | Cake 2 hrs. at 150° C |
|---|---|---|---|---|---|
| 4 | 1,700 | 6 | 8 | 20.7% | firm and flexible |
| 5 | 2,550 | 12 | 32 | — | firm and flexible |
| 6 | 700 | 16 | 12 | 15.2% | firm and flexible |

These non-aqueous 100% solids varnishes would provide excellent dipping varnishes having very good pot life, low weight loss and very good surface properties after a complete cure. Sample 6 provided an excellent combination of fast gel, low weight loss and low viscosity, and would also provide a very good impregnating varnish. All of these varnishes have 155° C to 175° C insulating capability and excellent flash points of about 80° C to 200° C.

Flexibility was determined as in EXAMPLE 1. The films exhibited adequate to good flexibility and a good dip build: Sample 4 provided 1 fold for 3.0 mils build; Sample 5 provided 6 folds for 2.0 mils build and Sample 6 provided 3 folds for 3.0 mils build.

Sample 6 was tested further for cake hardness, hot oil resistance and bond strength. The Shore D Hardness after 6 hours at T° C top/bottom was: 89/85 at 135° C and 91/86 at 150° C. The Shore D hardness and hot oil resistance after 48 hours at T° C top/bottom in 100° C Transformer Oil was: 72/70. The Bond Strength of varnished helical coils of enameled wire dipped in the varnish and baked: 4 hours at 150° C plus 1 hour at 200° C was: #23 at 25° C and #8 at 150° C.

There is some run-off of dipped equipment during the baking procedure using solventless varnishes, since the viscosity decreases rapidly when heat is applied and solvent evaporation does not take place to increase the viscosity. To reduce run-off, 4 parts of a commercial photoinitiator (sold under the Tradename Vicure 10 by Stauffer Chemical Co.) was added /100 parts of Sample 6 varnish. An enameled wire coil was dipped into this Sample 6 varnish and drained. The coil was then exposed to an ultraviolet lamp (1,000 watt mercury lamp) for 1 minute. It was then baked for 1 hour at 150° C with no run-off in the oven.

EXAMPLE 3

A non-aqeuous, high temperature, 90 wt.% solids, insulating, dipping varnish was prepared. The same procedure at the same times and temperatures was followed as in EXAMPLE 1 using 559.0 grams of tris (2 hydroxyethyl) isocyanurate polyhydroxy compound; 132.8 grams of isophthalic acid; 566.0 grams of soybean oil fatty acid; 19.6 grams of maleic anhydride and 0.30 grams of picric acid. This alkyd component was then dissolved in the monomer and diluent, with catalysts added as shown below in TABLE 5, to provide a non-aqueous varnish.

TABLE 5

| Sample | Alkyd grams | Reactive Monomer TMPTA | Accelerators Co | tBP | Inhibitor BQ | Diluent MC |
|---|---|---|---|---|---|---|
| 7 | 85 | 15 | 0.05 | 1.0 | 0.1 | 25 |

TMPTA = trimethylol propane triacrylate; MC = Methyl cellosolve (2-methoxy ethanol:boiling point = 124.3° C).

This insulating varnish contained 68 wt.% alkyd component, 12 wt.% alkyl acrylate monomer and 20 wt.% methyl cellosolve diluent. The alkyd component contained:
Equivalent % polyhydric alcohol = 61.3%
Equivalent % fatty acid = 19.35%
Equivalent % aryl + aliph. acid = 19.15%
Within the organic dibasic acid mixture:
Equivalent % aryl acid = 80%
Equivalent % aliph. acid = 20%

Tests were conducted using the same procedures as in EXAMPLE 1. The results of those tests are shown in TABLE 6:

TABLE 6

| Sample | Viscosity cps. at 25° C | Pot Life weeks at 25° C | Gel Time min. at 150° C | Wt. Loss 30 days at 200° C | Cake 2 hrs. at 150° C |
|---|---|---|---|---|---|
| 7 | 250 | 16 | 30 | 7.5% | fairly hard |

This varnish would provide an excellent dipping varnish, and an excellent impregnating varnish having outstanding weight loss characteristics. Flexibility was determined as in EXAMPLE 1. The exhibited adequate flexibility and a good dip build: 1 fold for 3.0 mils build. Thermal life tests were run on Sample 7 as in EXAMPLE 1, with the following results: 348 hours at 275° C; 1,190 hours at 250° C and 8,200 hours at 225° C. This shows that this varnish could be classified as a Class 200° C[30] varnish. The use of a minor amount of methyl cellosolve, as a high flash point diluent, did not cause any fire hazard or pollution problems, the flash point of this varnish being about 50° C to 60° C.

EXAMPLE 4

A non-aqueous, high temperature, insulating, dipping varnish was prepared using an initial monoglyceride step. Here, 216.4 grams (2.35 moles) of glycerol was initially reacted with 594.0 grams (0.676 mole) of soybean oil and 0.5 grams of lead oxide catalyst, at about 275° C for ½ hour. One mole of soybean oil contains 3 moles of fatty acids + 1 mole of glycerol. It thus contains 0.676 moles of glycerol (62.3 grams) and 2.028 moles of fatty acid (568 grams), minus 2.028 moles of water (36.6 grams) condensed out for esterification.

The monoglyceride reaction is between 2 moles of glycerol and 1 mole of drying oil to give 3 moles of monoglyceride. This reaction would require a minimum of 1.352 moles of glycerol to react with the 0.676 moles of soybean oil. The excess glycerol accelerates the reaction.

After the monoglyceride reaction, 233.0 grams (1.4 moles) of isophthalic acid, 58.8 grams (0.6 moles) of maleic anhydride and 0.26 grams of picric acid are added under the same conditions as in EXAMPLE 2.

The total reaction composition contains 279.0 total grams of glycerol (216.4 grams glycerol added as such + 62.6 grams of glycerol contained in the drying oil), 568 grams of soybean fatty acid (contained in the oil), 233 grams of isophthalic acid and 58.8 grams of maleic anhydride. This composition is the same as that used in EXAMPLE 2, and would have the same total Equivalent % of ingredients to form the alkyd component.

The alkyd component was then dissolved in trimethylol propane triacrylate and tetraethylene glycol diacrylate with added accelerators and inhibitors as in Sample 5 of EXAMPLE 2. This provided an excellent solventless, high temperature dipping varnish having an excellent flash point of over about 150° C.

I claim:
1. A high temperature capability, non-aqueous, low viscosity, insulating composition comprising a 75 wt.% to 100 wt.% solids blend of:
(A) about 40 wt.% to about 90 wt.% of an alkyd component consisting essentially of the reaction product of:
(i) about 55 equivalent % to about 70 equivalent % of a polyhydric alcohol,
(ii) about 8 equivalent % to about 25 equivalent % of a fatty acid having at least one double bond and between about 12 to 18 carbon atoms per molecule, (iii) about 15 equivalent % to about 40 equivalent % of an organic dibasic acid mixture consisting essentially of:

(a) about 40 equivalent % to about 90 equivalent % of an aromatic dibasic acid, and (b) about 10 equivalent % to about 60 equivalent % of an unsaturated aliphatic dibasic acid, and (B) about 10 wt.% to about 60 wt.% of an aklyl acrylate monomer having a molecular weight of over about 110 and a boiling point of over about 200° C, said composition characterized by having a flash point of over 45° C and a temperature capability of between 155° C and 220° C upon cure.

2. The insulating composition of claim 1, wherein the flash point of the composition is between 45° C and 200° C, the composition having a viscosity of between about 200 cps. to 2,000 cps. at 25° C, and a pot life of about 2 weeks to 1 year at 25° C.

3. The insulating composition of claim 2, wherein the polyhydric alcohol is selected from the group consisting of ethylene glycol, glycerol, 1,2-propanediol, diethylene glycol, triethylene glycol, neopentyl glycol, hexamethyleneglycol, 1,4-cyclohexanedimethanol, trimethylol ethane, trimethylolpropane, 1,4-butanediol, 1,5-pentanediol, pentaerythriol, tris (hydroxy alkyl) isocyanurate and mixtures thereof.

4. The insulating composition of claim 2, wherein the organic aromatic dibasic acid is selected from the group consisting of isophthalic acid, phthalic acid, phthalic anhydride, terephthalic acid, dimethyl terephthalate, trimellitic anhydride and mixtures thereof; and the organic unsaturated aliphatic dibasic acid is selected from the group consisting of maleic acid, maleic anhydride, fumaric acid and mixtures thereof.

5. The insulating composition of claim 2, wherein the fatty acid is selected from the group consisting of soybean oil fatty acid, linseed oil fatty acid, tung oil fatty acid, dehydrated castor oil fatty acid, tall oil fatty acid and mixtures thereof.

6. The insulating composition of claim 2 containing from about 0.02 part to 1.0 part per 100 parts insulating composition of an accelerator effective to act as a reaction catalyst.

7. The insulating composition of claim 2 containing from about 0.005 part to about 0.5 part per 100 parts insulating composition of an inhibitor effective to prevent gelation at 26° C.

8. The insulating composition of claim 1 containing up to about 25 wt.% of a diluent having a boiling point over 100° C.

9. The insulating composition of claim 8 containing from about 0.5 part to about 100 parts finely divided filler particles per 100 parts insulating varnish, wherein the diluent has a boiling point between 100° C and 145° C.

10. The insulating composition of claim 1 containing from about 0.5 part to about 6 parts per 100 parts insulating composition of a photoinitiator effective to initiate polymerization with ultraviolet light exposure.

11. The insulating composition of claim 1, wherein the alkyl acrylate monomer is selected from the group consisting of hexanediol diacrylate, neopentylglycol diacrylate, trimethylol propane triacrylate, tetraethyleneglycol diacrylate, pentaerythritol triacrylate, 2 ethyl hexyl acrylate, 2 hydroxy ethyl acrylate, and mixtures thereof.

12. The insulating composition of claim 1, wherein the alkyl acrylate monomer is selected from the group consisting of hexanediol diacrylate, neopentylglycol diacrylate, trimethylol propane triacrylate, tetraethylene glycol diacrylate and mixtures thereof.

13. A high temperature capability, non-aqueous, low viscosity, insulating, impregnating composition comprising a 100 wt.% solids blend of:

(A) about 40 wt.% to about 90 wt.% of an alkyd component consisting essentially of the reaction product of:

(i) about 55 equivalent % to about 70 equivalent % of a polyhydric alcohol, (ii) about 8 equivalent % to about 25 equivalent % of a fatty acid having at least one double bond and between about 12 to 18 carbon atoms per molecule, (iii) about 15 equivalent % to about 40 equivalent % of an organic dibasic acid mixture consisting essentially of:

(a) about 40 equivalent % to about 90 equivalent % of an aromatic dibasic acid; and (b) about 10 equivalent % to about 60 equivalent % of an unsaturated aliphatic dibasic acid; and (B) about 10 wt.% to about 60 wt.% of an alkyl acrylate monomer having a molecular weight of over about 110 and a boiling point of over about 200° C, said composition characterized by having a flash point of between about 75° C and about 200° C and a temperature capability of between 155° C and 220° C upon cure.

14. The insulating composition of claim 13, wherein the alkyl acrylate monomer is selected from the group consisting of hexanediol diacrylate, neopentylglycol diacrylate, trimethylol propane triacrylate, tetraethyleneglycol diacrylate and mixtures thereof.

15. The insulating composition of claim 14 containing from about 0.5 part to about 6 parts per 100 parts insulating composition of a photoinitiator effective to initiate polymerization with ultraviolet light exposure, the composition having a viscosity of between about 200 cps. to 2,000 cps. at 25° C and a pot life of about 2 weeks to one year at 25° C.

* * * * *